United States Patent [19]
Watson

[11] Patent Number: 5,350,925
[45] Date of Patent: Sep. 27, 1994

[54] METHODS FOR DETERMINING VALUES FOR EARTH FORMATION PROPERTIES

[75] Inventor: Charles C. Watson, Danbury, Conn.

[73] Assignee: Schlumberger Technology Corporation, New York, N.Y.

[21] Appl. No.: 171,503

[22] Filed: Dec. 22, 1993

Related U.S. Application Data

[60] Division of Ser. No. 568,282, Aug. 16, 1990, Pat. No. 5,282,133, which is a continuation-in-part of Ser. No. 281,577, Dec. 8, 1988, Pat. No. 4,958,073.

[51] Int. Cl.$^5$ .............................................. G01V 5/00
[52] U.S. Cl. .............................. 250/269.3; 250/264; 364/422
[58] Field of Search ............... 250/269, 270, 264, 265, 250/266; 364/422

[56] References Cited

U.S. PATENT DOCUMENTS

| | | | |
|---|---|---|---|
| 3,991,611 | 11/1976 | Marshall, III et al. | 364/422 |
| 4,390,783 | 6/1983 | Grau | 250/270 |
| 4,464,567 | 7/1984 | Flaum | 250/270 |
| 4,903,527 | 2/1990 | Herron | 364/422 |
| 4,914,944 | 4/1990 | Herron et al. | 364/422 |

*Primary Examiner*—Paul M. Dzierzynski
*Assistant Examiner*—Drew A. Dunn
*Attorney, Agent, or Firm*—David P. Gordon; Leonard W. Pojunas

[57] ABSTRACT

Methods are provided for processing spectral data detected by a gamma ray detector of a borehole tool in order to obtain quantitative determinations of formation and/or borehole properties. According to one invention aspect, spectral data are compressed using a principal components technique in order to find principal component coefficients. Those coefficients are supplied to an inverse filter which processes the data by inverting, deconvoluting, and filtering the data to provide determinations of formation properties such as formation density, Pe, and borehole parameters such as the mudcake thickness times the difference of the densities between the formation and mudcake. The principal components for which coefficients are found, as well as the inverse filter are generated from a calibration database. Prior information on noise and formation and/or borehole parameters are also utilized in forming the inverse filter. According to another invention aspect, spatial deconvolution is obtained by obtaining sets of principal components for each gamma ray detector and providing different pluralities of sets (spatial intervals) to the inverse filter. Also, where a backscatter detector is used in conjunction with far detector, spectral data from the far detector are processed by taking the logarithm thereof, while the spectral data from the backscatter detector is processed without taking a logarithm.

17 Claims, 4 Drawing Sheets

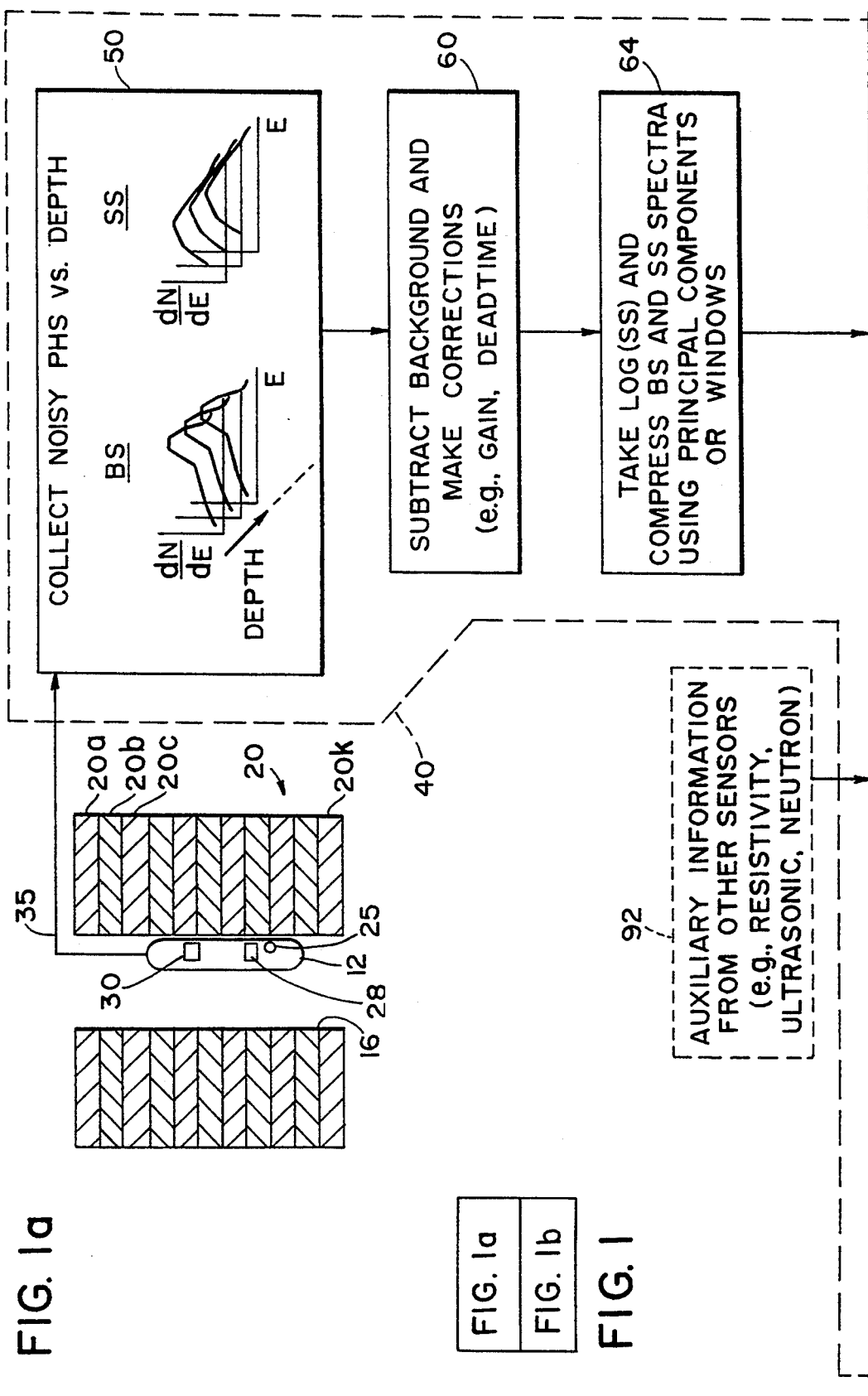

METHODS FOR DETERMINING VALUES FOR EARTH FORMATION PROPERTIES

This is a divisional of co-pending application Ser. No. 07/568,282 filed on Aug. 16, 1990 now U.S. Pat. No. 5,782,133.

Which is a continuation-in-part of copending U.S. Ser. No. 07/281,577 filed Dec. 8, 1988 now U.S. Pat. No. 4,958,073 which is assigned to the assignee hereof, and which is hereby incorporated by reference herein in its entirety.

BACKGROUND OF THE INVENTION

The present invention generally relates to methods for determining values for properties of earth formations. The present invention more particularly relates to signal processing methods for determining values for earth formation properties such as density and Pe (photoelectric factor) from photon energy information obtained by a nuclear logging tool.

Borehole logging instruments utilizing nuclear sources, and gamma ray (photon) detectors for obtaining indications of the density and $P_e$ of a formation surrounding the borehole are well known in the art. A typical such device comprises a sonde body containing a gamma ray radioisotopic source and two gamma ray detectors such as NaI crystal scintillators which are spaced from the gamma ray source by about six and twenty inches respectively. Details of such a device may be seen with reference to Wahl, et al.: "The Dual Spacing Formation Density Log", *Journal of Petroleum Technology*; December 1964 pp. 1411–1416, and with reference to U.S. Pat. Nos. 3,321,625 to Wahl, 3,864,569 to Tittman, and 4,048,495 to Ellis. In the devices described in the article and patents, it is disclosed that the count rate of the far detector is an exponential function of the formation density. However, because the count rate of the far detector is also affected by the mudcake in the borehole, and hole rugosity, the second detector (i.e. the near detector) is used as a means for obtaining information which can be used to compensate the far detector for mudcake and rugosity effects. The method of compensation is set forth in the above-recited Wahl article and is known as the "spine-and-ribs" method. The spine-and-ribs method plots the short spacing detector counting rate for a particular energy window against the long spacing detector counting rate for a different energy window. For a given tool with given spacings, a "spine" is developed in laboratory testing which reflects the relative detector responses for variations in formation density only. The "ribs" extend from the spine and reflect the effect of mudcake thickness and mudcake density on the readings. Thus, by using the count rates of the detectors as inputs, a cross-plot location corresponding to a point on a rib extending from the spine is found. The formation density is then determined by tracing the rib on which the point is located back to the spine, with the intersection of the rib and spine dictating the formation density, and the location on the rib dictating mudcake parameters. Additional advantageous results are obtained, as disclosed in the Ellis patent, by comparing the count rates obtained in different energy windows.

While the spine-and-ribs analysis and improvements thereon for determining formation density is quite effective for the tool disclosed in the above-referenced patents, other tools using nuclear sources and photon detectors exist where such an analysis may not be optimal. In particular, in copending U.S. Ser. No. 07/281,577, a tool is disclosed having a NaI or GSO gamma ray detector preferably placed within one inch of the gamma ray source, and a second such gamma ray detector preferably placed more than four inches away from the source. As described in the copending application, by placing the short spacing detector so close to the source, it will have a non-negative response to an increase of density in the earth formation, while the second detector which is spaced further from the source will have a negative response to an increase in formation density. While the spine-and-ribs approach could be modified by one skilled in the art to provide results for such a tool, it is believed that the different physics associated with such a tool requires different analysis for optimal results. Also, it is believed that because the tool of U.S. Ser. No. 07/281,577 has such a detector which is spaced so close to the source, that fine resolution measurements of earth formation properties should be obtainable. However, data processing techniques to provide fine resolution measurements have not been provided by the art, as the prior art gamma-gamma type tools had detectors which were spaced much farther from the source, and the measurements obtained were recognized as averages over long spacings (approximately one foot).

SUMMARY OF THE INVENTION

It is therefore an object of the invention to provide signal processing methods for determining values for earth formation properties from photon energy and intensity information obtained by a nuclear logging tool.

It is another object of the invention to provide signal processing methods for nuclear logging tools which utilize a principal component analysis on the pulse height spectra generated by photon detectors.

It is a further object of the invention to provide signal processing methods for a gamma-gamma type tool having a short spaced detector having a non-negative response, and a far spaced detector having a negative response to an increase of earth formation density.

It is also another object of the invention to provide methods for determining values for properties of an earth formations, where the responses of a plurality of photon detectors are deconvolved over different lengths of the formation in order to provide a property value at a given depth of the formation.

It is yet a further object of the invention to provide signal processing methods for nuclear logging tools where the signal processing methods utilize adaptive filters for deconvolving and filtering the responses of a plurality of photon detectors in order to obtain determinations of formation parameters such as density and Pe and/or borehole parameters such as mudcake thickness and density.

In accord with the objects and several preferred aspects of the invention, data is taken from a gamma-gamma type tool having a short spaced (i.e. backscatter) detector with a non-negative response and a far spaced detector with a negative response to increases in formation density. The data is first preprocessed to correct for unwanted background and gain inaccuracies. Then, according to one preferred method, the preprocessed data from the far detector is processed by taking the logarithm of the data, and the processed far spaced detector data, and the preprocessed backscatter detector data are then compressed via a principal components technique to provide principal component vectors. Principal component vectors for data samples over predetermined spatial intervals are then applied to an inverse filter which further processes the data by inverting, deconvoluting, and filtering the data to provide determinations of formation properties such as formation density, Pe, and borehole parameters such as the mudcake thickness times the difference of the densities between the formation and mudcake. The inverse filter is generated from a calibration database, as well as from prior information on noise and formation and/or borehole parameters. The inverse filter is preferably arranged such that vectors from different spatial intervals for the backscatter and far spaced detectors are applied to the inverse filter in! order to provide the quantitative determinations of formation and/or borehole properties.

According to another preferred method, instead of compressing the preprocessed backscatter detector data and the processed far spaced detector data via a principal components technique, the preprocessed backscatter and far spaced detector data are integrated over certain energy intervals to provide responses for a plurality of "windows", and the logarithm of each far spaced detector response window is taken. The logarithm of the data from the far spaced detector windows, and the data from the backscatter detector windows are then applied to an inverse filter which provides determinations of formation properties. The inverse filter for the windows method, while being different than the inverse filter of the principal components method, is generated in a similar manner, and data from different spatial intervals for the backscatter and far spaced detectors is preferably used to provide the determinations.

Other preferred aspects of the invention include the provision of an iteration loop to adjust the inverse filter by utilizing the deconvolved output determinations, and the utilization of other information from other tools or different types of sensors on the same tool for adjusting the inverse filter.

Further objects and advantages of the invention will become evident to those skilled in the art upon reference the detailed description taken in conjunction with the provided figures.

BRIEF DESCRIPTION OF THE DRAWINGS

FIGS. 1, 1A and 1B are a partial schematic, partial flow chart of the signal processing method invention;

FIGS. 2b and 2c are respectively graphs of the first three and the fiftieth and fifty-first principal component vectors for the third data set of FIG. 2a.

DETAILED DESCRIPTION OF THE PREFERRED EMBODIMENTS

Figure 1B:
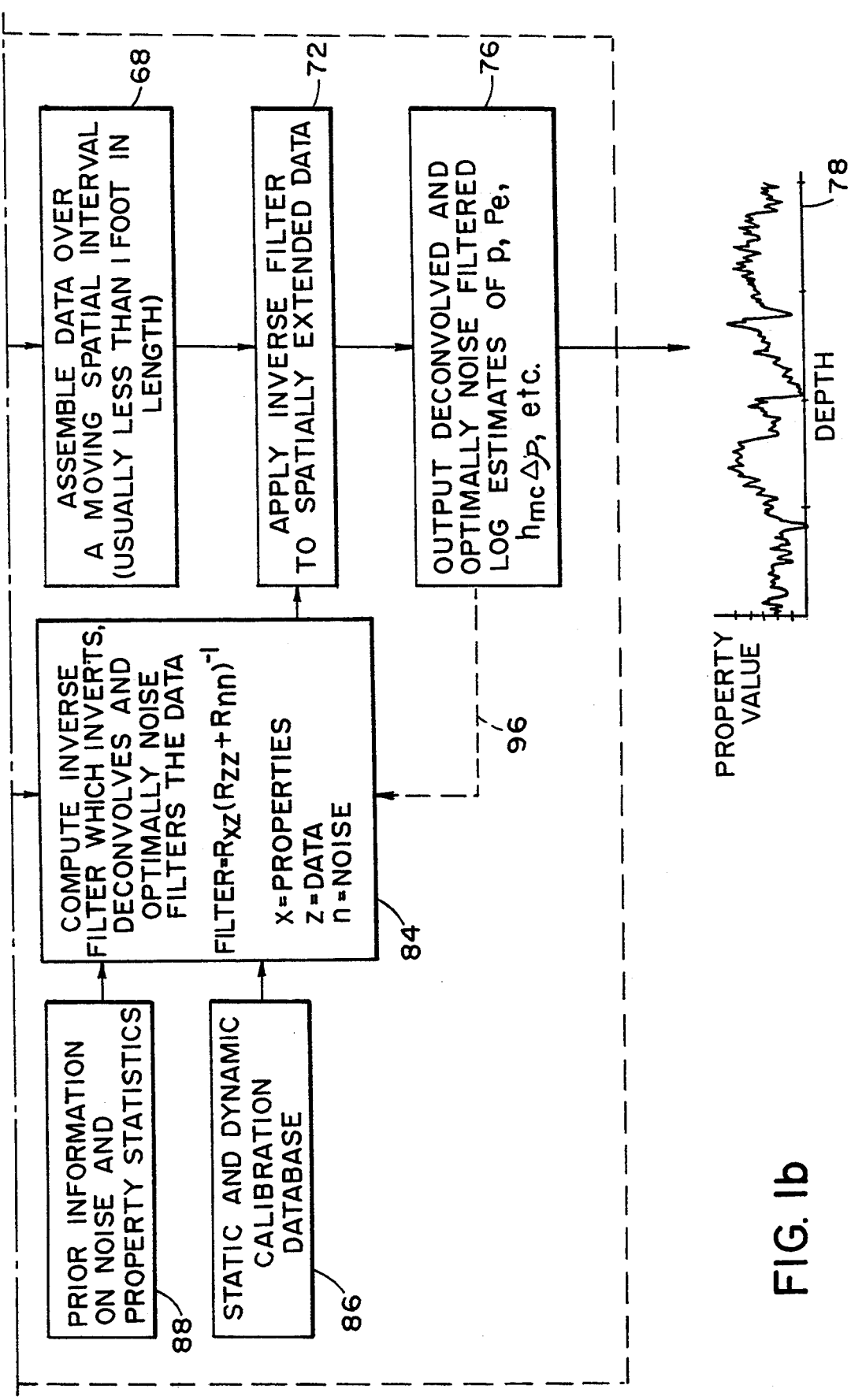

Turning to FIG. 1, a borehole tool 12 suspended in a borehole 16 traversing an earth formation 20 is seen in simplified format. The earth formation 20 is comprised of numerous layers 20a, 20b, 20c . . . past which the borehole tool 12 is dragged. Each formation layer may have different values for various formation properties such as formation density, Pe, etc. The borehole tool 12 is shown with a nuclear source 25, with two detectors 28 and 30, and with a cable 35 over which data is relayed to a data processing means such as a suitably programmed computer 40. The nuclear source 25 is preferably a monoenergetic gamma ray source such as a $^{137}Cs$ source providing gamma rays having an energy of 662 KeV. The detectors 28 and 30 are preferably GSO detectors with associated photomultiplier tubes which provide electronic pulses with voltages proportional to the energy of the gamma rays incident the detectors. Detector 28 is preferably located so close to the gamma ray source 25 such that the response of detector 28 is non-negative for an increase in formation density. Detector 30, on the other hand, is located such that its response is negative for a formation density increase. Details of the borehole tool 12 are set forth in copending U.S. Ser. No. 07/281,577, previously incorporated by reference herein.

As the borehole tool 12 is dragged in the borehole 16, the detectors 28 and 30 detect gamma rays which were Compton scattered (single or multiple times) by the formation as well as gamma rays which were directly transmitted from the source to the detector without having been scattered by the formation. Information regarding the different energies of the detected gamma rays are collected for predetermined intervals of time (e.g. one second) and are forwarded uphole via the cable 35 to the computer 40 or other processor.

According to the preferred method invention, at step 50, pulse height information for both the backscatter detector 28 and the far detector 30 are collected in the computer for processing. In particular, each data transmission from the borehole tool 12 to the computer 40 will provide indications of the number of photons received at each of numerous energies (i.e. in each of numerous channels), and that information is stored in the computer. At 60, the collected data (also referred to as the "spectrum") is preprocessed by gain correcting the data and by subtracting background data accumulated by the tool. Gain correction is typically accomplished by locating a small auxiliary source (not shown) adjacent the detector crystal. The auxiliary source provides a line source at 662 keV. With the line source, any voltage variances which occur when converting photon energy to a pulse height voltage or which are due to electronic effects in the tool or cable and which shift the spectrum (i.e. shifts the 662 keV line from 662 keV) are easily detected. As will be appreciated by those skilled in the art, gain correction may be accomplished downhole rather than by the computer 40.

If desired, the preprocessing step 60 may correct for inaccuracies resulting from detector deadtime; the deadtime of a detector being the time immediately subsequent to the receipt of a photon during which the detector is unable to detect the receipt of another photon. It is known that due to the random nature of the distribution of photon detection events, the relationship between the measured count rate and the actual rate at which photons arrive at the detector is nonlinear at high count rate levels. It is advantageous to correct the count rates for this nonlinear deadtime effect in order to more readily compare high count rate data to low count rate data. The procedure for making this deadtime correction is well known to those skilled in the art (see e.g. Nicholson, P. W., *Nuclear Electronics*: (John Wiley & Sons, 1974)), and due to its nonlinearity should be applied separately to the measurement data and to the background data hereinafter described before the background data is subtracted from the measurement data.

The preprocessing step 60 of subtracting background data accounts for the transmission of photons from the source to the detectors without interaction with the formation. Because shielding is preferably provided between the source and detector, the background photons are significantly limited. However, background photons of different energies are still detected by the detectors. The procedure for subtracting background data involves previously conducting calibration procedures out of the borehole. Typically, the count rates and pulse height spectra for each of the detectors of the tool is measured while the tool is suspended in air prior to lowering into the borehole. These measurements constitute the background information for the tool for the time the borehole measurements are made. For each spectrum transmitted uphole, the background information is then used to correct the gain corrected spectra to provide corrected spectra which may be further processed as described hereinafter.

Once the corrected spectra have been obtained by preprocessing, the spectra are processed according to steps 64, 68, 72, and 76 to provide a log of one or more formation property values as indicated at 78. At step 64, according to a first preferred method of the invention, the logarithm of the counts in each channel of the corrected spectrum for the far spaced detector is taken. The so-processed values for the far detector, and the values of the backscatter detector are then compressed by computing their projections onto a small set of principal component spectral vectors as described in more detail below.

The different processing of the data from the far detector and the backscatter detector results from an understanding of the physics underlying the detector responses. The far detector by definition is in the attenuation regime, and its response varies in an approximately exponential fashion with density, with an increase in formation density providing a decrease in count rates. The response of the far detector is therefore as described in the prior art:

$$\text{far detector count rate } \xi e^{-\mu \rho d} \tag{1}$$

where $\mu$ is an attenuation coefficient, $\rho$ is the formation density, and d is the spacing of the far detector from the nuclear source. In processing the data, it is therefore advantageous to take the logarithm of the far detector count rate, as the logarithm of the far detector count rate is proportional to the simple function $-\mu\rho d$. The near (backscatter) detector, on the other hand, in the preferred arrangements shown in copending Ser. No. 07/281,577, is not dominated by attenuation, as is the near detector shows an increase in count rate as the formation decreases. The response of the near detector has been found to be reasonably defined by:

$$\text{near detector count rate } \xi \rho e^{-\mu \rho d} \tag{2}$$

where the non-exponential portion of the function is dominant over the exponential portion. Effectively, the near detector response is nearly linear. Thus, in processing the data from the near detector, it is not necessary to take the logarithm of the data.

In conducting a principal components analysis on the spectral count rates (or logarithms thereof), the goal is to compress the data by analyzing the information contained in the spectrum and determining the significant independent modes of variation in the preprocessed spectrum and the coefficients associated therewith. While principal components analysis of spectral data is not known in the art (except as disclosed in a paper of the applicant hereof in conjunction with A. Becker entitled "The Compton and Photoelectric Spectroscopy of Multiply Scattered Photons", published in IEEE Transactions on Nuclear Science, Vol. 37, #2 p. 923 (April, 1990)), the principal components technique is known and is disclosed in e.g. H. Hotelling, "Analysis of a Complex Statistical Variable Into Principal Components", *Journal of Educational Psychology*, Vol. 26, p. 417 (1933); N. Ahmed and K. R. Rao, *Orthogonal Transforms for Digital Signal Processing*, Springer-Verlag (New York, 1975). In fact, computer programs for conducting a principal components analysis on data are known and available; e.g. "S" is available from AT&T Technologies Software Sales, Greensboro, N.C. Regardless, a short discussion of the method of conducting a principal components analysis on spectral data is instructive.

In conducting the principal component analysis on the spectral data, each preprocessed data set is associated with a column vector z of dimension I, with the logarithm of the number of counts per second for each channel (in the case of the far detector), or the number of counts per second for each channel (in the case of the backscatter detector) as the elements of the column vector. Ultimately it is desired to relate the variations in z to property variations in the formation. If this relationship were significantly nonlinear, z might exhibit addition modes of variation solely as a consequence of the nonlinearity. In order to minimize effects of nonlinearity, it is appropriate to define the components of z according to $$z_i = N_i - <N_i> \tag{3}$$

where for the backscatter detector, $N_i$ is the number of photons detected per second in channel i, for the far detector $N_i$ is the logarithm of the number of photons detected per second in channel i, and where the brackets $<>$ signify an average over an ensemble of spectra. The ensemble average is preferably calculated from all the spectra contained in a calibration database.

The spectral covariance matrix is then formed by averaging over the calibration database ensemble:

$$R_{zz} = <zz^T> = (1/M) \sum_{m=1}^{M} z_m z_m^T = V\Lambda V^T \tag{4}$$

where the covariance matrix $R_{zz}$ is an I by I matrix (I=number of channels), $z^T$ is the transpose of z, $z_m$ is a column vector which is a member of the database containing M spectra, $z^T_m$ is a row vector which is the transpose of $z_m$, V is an orthogonal matrix whose columns are the eigenvectors of $R_{zz}$ (also referred to as the principal component vectors), $V^T$ is the transpose of the orthogonal matrix V, and $\Lambda$ is a diagonal matrix whose diagonal elements $\{\lambda_i\}$ are the eigenvalues of $R_{zz}$. The $\{\lambda_i\}$, which are also the variances of the principal components, by convention are ordered by decreasing magnitude. For a particular spectral vector z, the principal components of z are the components of the vector z' obtained from z by the transformation $$z' = V^T z \tag{5}$$

The principal components of z are uncorrelated amongst themselves. The first principal component is that component of z having the highest variance; the second principal component is that one which has the highest variance of all components orthogonal to the first, and so forth. Thus, the first few principal components may contain nearly all of the variance of z, and can represent z with only negligible error.

Figure 2A:
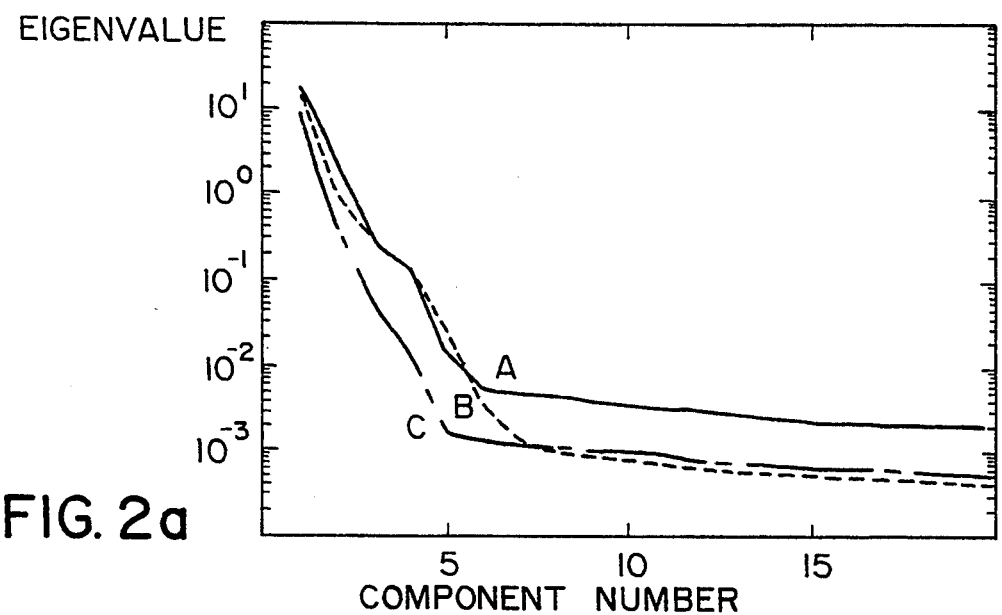
FIG. 2a is a graph of the first twenty eigenvalues for three different data sets.

Turning to FIG. 2a, values are seen for the first twenty eigenvalues of $R_{zz}$ plotted as a function of principal component number for three sets of spectral data (spectral ensembles). The data were obtained from a detector of a laboratory mockup of a borehole logging tool corresponding to the far detector of the preferred borehole logging tool, which was passed through a laminated laboratory formation whose laminae were of known density and element composition. The curve labeled "A" corresponds to a set of four scans acquired with a tool having the detector at nine inches from the source, and with the tool having no stand-off from the formation, stand-off of 0.25 inches generated by the interposition of plexiglass between the tool and formation, and stand-off of 0.25 and 0.5 inches generated by the interposition of barite loaded rubber. The curve labeled "B" corresponds to the same set of four scans, made with a tool having the detector at six inches from the source. The curve labeled "C" represents an ensemble composed of the no stand-off scan only for the tool having the detector spaced at six inches from the source.

As seen in FIG. 2a, the eigenvalue spectrum has similar structure in all three cases, with the variances decreasing precipitously by more than three orders of magnitude over the first four to six principal components, followed by a sharp break to a gradually decreasing trend. Such a spectrum may be interpreted as indicating that the first few component represent pulse height spectral variation related to the variations in the properties of the formation, whereas the higher order components are dominated by the uncorrelated noise fluctuations in the pulse height spectra due to photon counting statistics. The higher order eigenvalues are, in fact, consistent in magnitude with the statistical variances expected from the observed number of counts per channel in the pulse height spectrum. The offset in the higher order variances between cases A and B is also quantitatively consistent with the decreased number of detected photons per channel in the former case, due to the longer distance from the source to the detector.

Figure 2B:
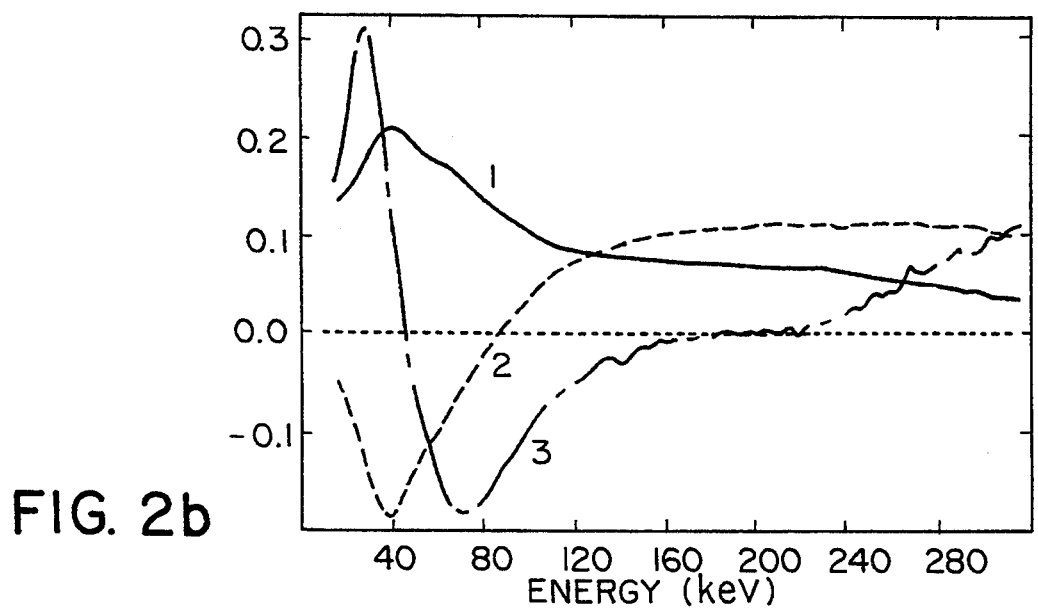
Figure 2C:
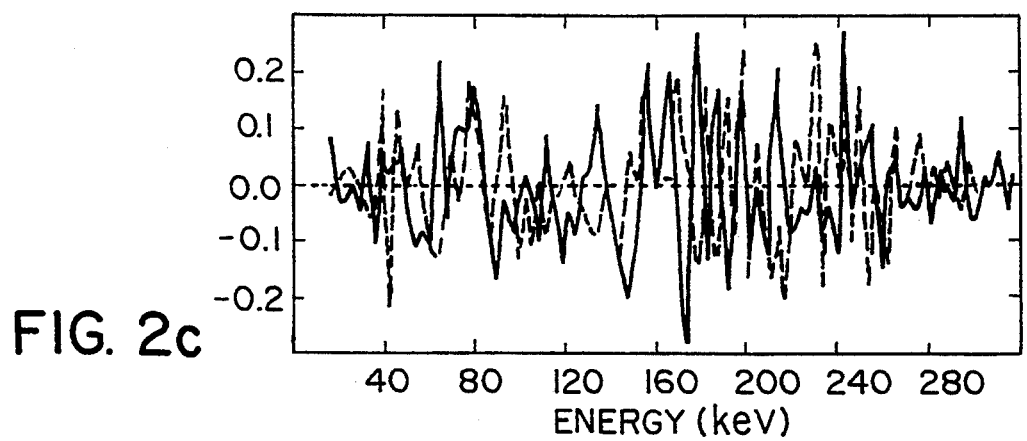

Analysis of the principal component vectors lends further support to the above interpretation. As seen in FIG. 2b, the first three eigenvectors of $R_{zz}$ in case C of FIG. 2a, clearly correspond to highly correlated variations in the pulse height spectrum. On the other hand, as seen in FIG. 2c, the fiftieth and fifty-first principal vectors appear to represent fluctuations which have low correlation from channel to channel.

Based on the above analysis, it is believed that the pulse height spectrum generated by a gamma-gamma tool such as the preferred tool of copending Ser. No. 07/281,577, can be very accurately represented by a small number (e.g. four, five or six) of significant independent components (principal components). The components chosen are preferably those whose variances are greater than the background noise level in the ensemble, and which together account for the vast majority of variance. For example, in case C of FIG. 2a, the first four eigenvalues contain 99.72% of the total variance of the ensemble, and thus, those four components should be sufficient for representing the pulse height spectrum.

Returning to FIG. 1, the principal component coefficients, obtained as in (5) above, associated with several spectra, and representing in a compressed format the data forwarded by the borehole tool at different borehole depths to the computer, are assembled at step 68. Assembly of data for different spectra is necessary, as the detectors are receiving information regarding different locations in the formation because of the numerous ways in which a photon may be Compton scattered in the formation prior to being detected by a detector. Thus, spectral data sent by the borehole logging tool at one location in the formation includes information about the properties of the formation property at nearby locations in the formation as well.

Figure 3:
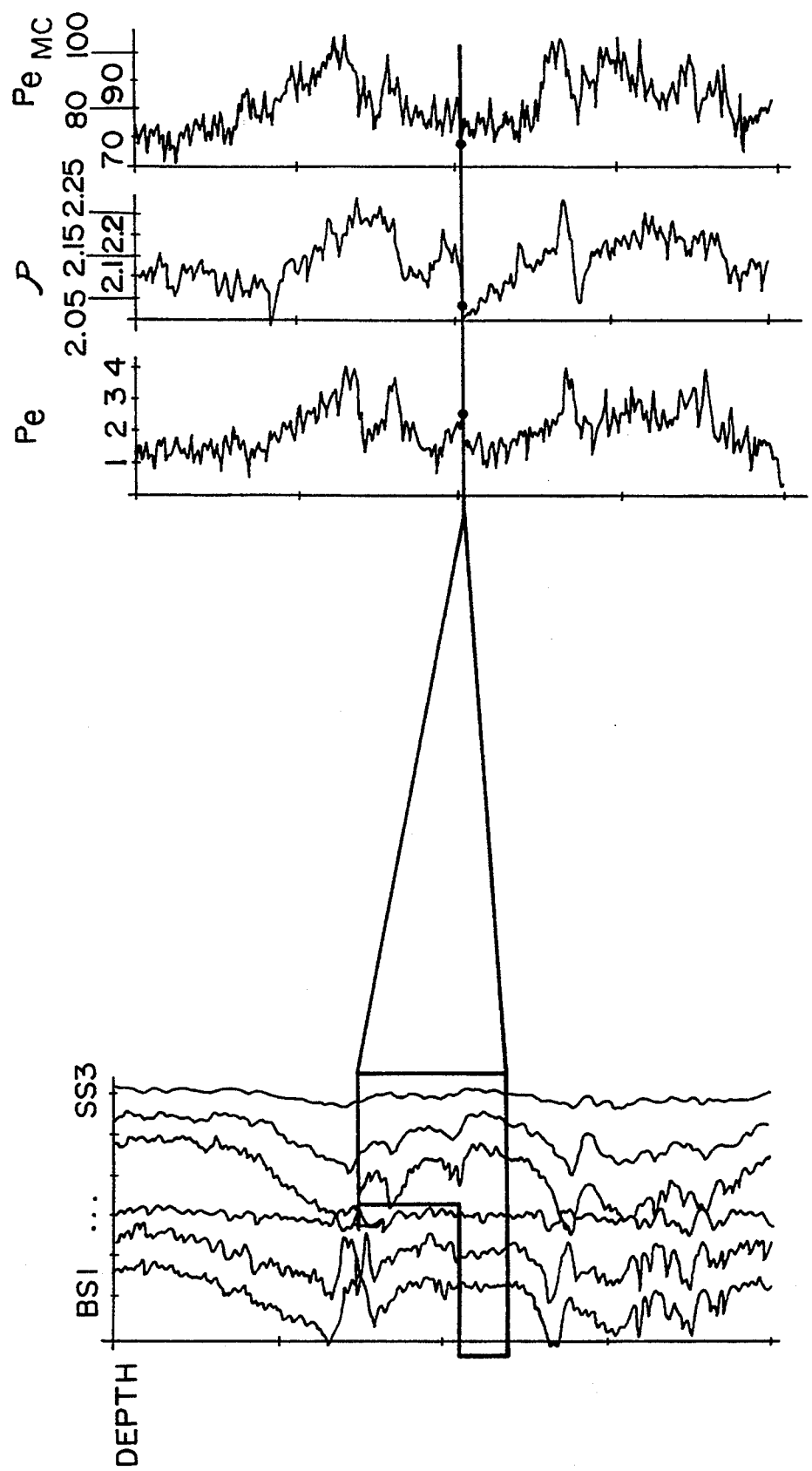
FIG. 3 is a diagram representing how different spatial intervals are utilized on different principal component vector or energy window data to provide a quantitative determination at a single borehole depth of a plurality of different formation properties.

The particular spectra utilized for the determination of a formation and/or borehole environmental property value at a particular location of the formation are chosen carefully. Preferably, the utilized spectra represent information obtained from an interval slightly larger (e.g. two to four inches) than the source-detector spacing itself, and are so chosen as to include at least all of the responses of the tool at various depth locations which have significant sensitivity to variations in the formation or environmental property which is to be estimated at the said particular location. Preferably, as seen in FIG. 3, the numbers of spectra utilized for the different detectors differ, with fewer backscatter detector spectra utilized than far detector spectra. The difference in numbers of spectra utilized relates to the fact that the photons received by a detector located very close to the source are more likely to correspond to photons which were Compton scattered near the source (and detector); i.e. a smaller vertical section of the formation is investigated. The far detector, by dint of its location further from the source, is more likely to receive most of its information from photons which were Compton scattered by a larger vertical section of the formation. Also, it should be appreciated that the number of principal component vectors utilized to represent the spectrum of the backscatter detector and the far detector at a given depth in the formation might differ.

At step 72 of FIG. 1, the assembled principal component vector data are applied to an inverse filter which deconvolves and filters the data to provide at 76 determinations of formation properties such as formation density ($\rho$), $P_e$, and borehole parameters such as the mudcake thickness times the difference of the densities between the formation and mudcake ($h_{mc}\Delta\rho$). The formation property determinations may then utilized to provide a tangible graph or log 78 which plots the property value as a function of depth in the borehole.

In order to apply the inverse filter at step 72 to the principal component vector data, the inverse filter must first be computed at 84. In order to compute the inverse filter at 84, a calibration database (preferably the same database used in computing the principal component vectors) is provided at 86, and prior information on noise, such as logging speed data and calibration information on noise for the particular tool, and prior information on property statistics such as the average value and standard deviation of formation and/or borehole properties expected to be encountered are provided at 88. As described hereinafter, the prior information on property statistics and noise is utilized in constructing the noise filter. The prior information is preferably particular information which is known regarding the formation and/or borehole (e.g. that the formation is sandstone or limestone and has a particular average density; that the borehole does or does not contain barite, etc.). In addition to prior information, auxiliary information may be obtained such as at 92 from other borehole tools or from sensors other than gamma ray sensors, and may be utilized in a manner similar to prior information to further limit and define the probable values of formation and/or borehole parameters at particular depths in the borehole. Regardless, if prior or auxiliary information is not available, the calibration database may be utilized to provide property statistics and standard deviations.

Preferably, the inverse filter is a linear inverse filter, and is computed as follows. First, it is appreciated that the desired output from the linear inverse filter is a determination at a given depth in the formation of several formation and/or environmental properties of the formation and/or borehole. As discussed above, the determinations are made utilizing data accumulated by the borehole tool at several adjacent depths in the borehole. The determination (which is in reality an estimate) for any vector of property values x is made according to the following relationship $$x = <x> + G(z'' - <z''>) \quad (6)$$

where $<x>$ is the ensemble average of the vectors of the property values, G is as defined below, $<z''>$ is the ensemble average of the $z''$ vectors, and $z''$ is a vector representing the preprocessed tool responses (or the logarithm thereof in the case of the far detector) which have been reduced by the principal components transformation at step 64 according to (5) above and which have further been assembled over a spatial interval in step 68; i.e.

$$z''^T = (z'_{11}, z'_{21}, \ldots, z'_{p11}, z'_{12}, z'_{22}, \ldots, z'_{P22}, \ldots, z'_{PLL}) \quad (7)$$

where $z'_{ij}$ is the $i^{th}$ principal component coefficient of the response of the tool at depth position j, $P_j$ is the total number of principal components utilized at depth position j, and L is the total number of depth positions utilized to estimate a property value at a given depth position. As used in relationship (6) above, G is a $Q \times R$ matrix, where Q is the number of properties to be estimated and R is the total number of data values utilized in the estimate; i.e. the number of components of the data vector $z''$. The number of components of the data vector $z''$ is in turn equal to the sum of the $P_j$ over the L depth positions. It will be appreciated that $<x>$, $<z''>$, and G are preferably computed from laboratory data. It should further be noted that not all responses need be included at each depth position, as different detectors will have different vertical windows as described above with reference to FIG. 3.

To obtain the laboratory database, the borehole tool or a tool substantially similar thereto is preferably scanned past inhomogenous formations of known structure and composition as hereinbefore described. Sheets of materials are interposed between the tool and formation to simulate mudcake and standoff effects. The data collected, i.e. the calibration database, constitutes an ensemble of known x and $z''$ values, where the $z''$ vectors contain negligible noise. Of course, if desired, the borehole tool may also or alternatively be placed in different homogenous formations to obtain database information.

From the calibration database, $<x>$ and $<z''>$ are determined as follows:

$$<x> = \left( \sum_{m=1}^{M} w_m x_m \right) / \left( \sum_{m=1}^{M} w_m \right) \quad (8)$$

$$<z''> = \left( \sum_{m=1}^{M} w_m z''_m \right) / \left( \sum_{m=1}^{N} w_m \right) \quad (9)$$

where M equals the number of $(x, z'')$ pairs in the calibration database, and where $w_m$ $(1 < m < M)$ is a set of weights. The weights for the averaging process are chosen to make the averaged properties correspond more closely to the actual conditions encountered in the borehole, and to achieve consistency with prior and auxiliary information provided at step 88 and 92 respectively. For example, it might be known that the particular borehole being logged contained barite mud. In that case, a set of weights could be chosen which would result in an inverse filter more closely optimized for such a situation. For example, $w_m = 0$ for database points containing non-barite mud simulation, and $w_m = 1$ for all other points. This technique of modifying the weight distribution can also be utilized adaptively in a feedback capacity as described below in order to make the weights self-consistent with the properties estimated (determined) from the inverse filter.

The matrix G is determined according to the following relationship:

$$G = R_{xz''}(R_{z''z''} + R_{nn})^{-1} \quad (10)$$

where $R_{nn}$ is a matrix which models the statistical noise covariance at the particular logging speed, and $R_{xz''}$ and $R_{z''z''}$ are defined according to:

$$(R_{xz''})_{ij} = \sum_{m=1}^{M} w_m (x_i - <x>_i)_m (z''_j - <z''>_j)_m / \sum_{m=1}^{M} w_m \quad (11)$$

$$(R_{z''z''})_{ij} = \sum_{m=1}^{M} w_m (z''_i - <z''>_i)_m (z''_j - <z''>_j)_m / \sum_{m=1}^{M} w_m \quad (12)$$

It will be appreciated that the matrix G set forth above at (10) can be rewritten as follows:

$$G = R_{xz''} R_{z''z''}^{-1} R_{z''z''} (R_{z''z''} + R_{nn})^{-1} \quad (13)$$

from which it can be seen that the matrix G effects noise filtering through the presence of the matrix $R_{nn}$ such that an application of the tool response $z''$ to the noise filter $R_{z''z''}(R_{z''z''} + R_{nn})^{-1}$ provides a vector representing the noise corrected tool response. The inversion matrix $R_{xz''} R_{z''z''}^{-1}$ represents the relationships of the various formation properties to noise-free changes in the tool response. Thus, the application of the noise corrected tool response vector to the inversion matrix provides a quantitative determination of formation and other properties contained in x.

As aforementioned, matrix $R_{nn}$ is optimized for a particular sampling interval and logging speed which recognizes that at different logging speeds and sampling intervals the number of events (detections of gamma rays) will differ, thereby providing different statistical precision. In fact, the physics of the statistical fluctuations in the detected number of gamma rays in a given channel of the pulse height spectrum of a given detector can be accurately described in terms of a Poisson process. Thus, it may be assumed that the variance of the number of counts detected in a channel over one depth sampling interval (time sampling interval) is equal to the mean number of counts detected in such samples, which depends on the logging speed and the length of the sampling interval. It may further be assumed that the statistical fluctuations are uncorrelated from channel to channel, and from depth position to depth position. The subtraction of the background spectra during the preprocessing steps described above necessitates that the estimates of the noise variances in the channels be modified (increased) to account for the statistical uncertainties in the background spectra. Such corrections are well known in the art. Finally, in the case that the logarithm of the channel data are taken (as for the long spacing detector), the statistical noise variance of this reduced data is approximately equal to the reciprocal of the mean number of counts detected in the channel. From these considerations, the noise covariance matrix for the channel data may be formed, and subsequently transformed as described above. Thus, $R_{nn}$ is computed by forming a noise covariance for each channel of the pulse height spectrum for each detector at each depth location, and then applying the principal component transformation to the covariance matrix for each detector at each depth position and finally combining the transformed covariance matrices to form a block diagonal $R_{nn}$.

If desired, the density, $P_e$ or other determination made at step 76 may be utilized in a feedback capacity as indicated at 96 to tune the filter to sections of the database 86, thereby making the filter G adaptive. In particular, the calibration database provided at 86 for the inverse filter may be divided into subsets: e.g. a subset for boreholes having barite in the mud; a subset where there is no mudcake; a subset for high density formations, etc. By choosing a set of weights which emphasizes some of these subsets more than the others, according to prior information provided at step 88, the auxiliary information provided at 92, or according to information obtained at step 76, the inverse filter can be adjusted because filters $R_{xz''}$ and $R_{z''z''}$ are adjusted. With an adjusted filter which is tuned to more closely reflect the makeup of the formation and the borehole environment, refined quantitative determinations can be made. Further refinement can be achieved by iteratively adjusting the weights until self-consistency is obtained between the weight distribution, the prior and auxiliary information, and the estimates of the formation and environmental properties made from the gamma ray data.

While a first preferred embodiment of the method invention utilizes a principal components technique for compressing data which is used as an input into the filter G, another preferred embodiment utilizes a "windows" approach to compressing the data. In the windows approach, the corrected pulse height spectra obtained at step 60 due to preprocessing are integrated at step 64 over several energy intervals or windows; or, if desired, the windowing may be done downhole by the borehole tool itself. Regardless, the logarithm of the window values for the far detector are then taken, while the window values for the backscatter detector are used directly as inputs into step 68 which assembles the data. While steps 68, 72, and 76 are then practiced as described above with respect to the method utilizing the principal components technique, it will be appreciated that the details of the inverse filter G will differ, as covariance matrices $R_{xz''}$, $R_{z''z''}$, and even $R_{nn}$ will be different.

There have been described and illustrated herein methods for the quantitative determination of formation properties. While particular embodiments of the invention have been described, it is not intended that the invention be limited thereby, as it is intended that the invention be as broad in scope as the art will allow. Thus, while the invention was described with reference to a gamma-gamma type tool having a backscatter detector and a far detector as described in copending U.S. Ser. No. 07/281,577, it will be appreciated that the invention applies likewise to prior art gamma-gamma type tools with two detector with negative responses to increases in formation density, as well as to gamma-gamma type tools with single detectors, and to X-ray-X-ray tools with one or more detectors. Likewise, certain aspects of the invention such as the spatial deconvolution filter and the noise filter may also be applied to neutron-gamma type spectroscopy tools which provide elemental determinations, as well as neutron-neutron type tools which measure total neutron flux. It will be appreciated that where neutron flux is being measured, the preprocessing disclosed is also different as no gain correction and no deadtime correction is required. Further, while a linear inverse filter G was described as being applied to a data vector, it will be appreciated that the inverse filter applied need not be linear. Neither must the linear inverse filter include means for filtering statistical noise, although such a noise filter is definitely preferred. Also, while particular properties of the formation such as density and $P_e$ were described as being quantitatively determined, it will be appreciated that other properties can be determined provided the property will affect the quantities or energies of the gamma rays being detected (or the neutron flux in the case of a neutron-neutron type tool). Therefore, it will be appreciated by those skilled in the art that yet other modifications could be made to the provided invention without deviating from its spirit and scope as so claimed.

I claim:

1. A method for determining values for at least one earth formation property or at least one borehole environmental property at at least one depth in a formation, utilizing a borehole tool having a nuclear source, a first gamma ray detector spaced apart from said nuclear source by a first distance, and a second gamma ray detector spaced from said nuclear source by a second distance, and utilizing a data processing means and means for providing to said data processing means from said borehole tool spectral data indicative of gamma rays detected by said first and second gamma ray detectors in a plurality of energy channels over a plurality of periods of time, said method comprising:
   a) running said borehole tool in a borehole and obtaining sets of data indicative of radiation detected by said first and second gamma ray detectors in a plurality of energy channels over a plurality of periods of time relating to a plurality of locations of said borehole tool in said borehole;
   b) compressing said sets of data indicative of radiation detected by said first and second gamma ray detectors at a plurality of locations to obtain first sets of compressed data for said first gamma ray detector and second sets of compressed data for said second gamma ray detector; and c) applying a first plurality of said first sets of compressed data and a second plurality of said second sets of said compressed data to an inverse filter comprised of a spatial deconvolution inversion matrix representing the relationship of said at least one earth formation property to the distribution of said spectral data in said plurality of energy channels, and obtaining therefrom at least one value for said at least one earth formation property, wherein said first plurality of first sets of compressed data and said second plurality of second sets of compressed data represent data collected at non-coextensive periods of time.

2. A method according to claim 1, wherein:

said step of compressing comprises utilizing a principal components technique on each set of data to determine sets of a plurality of principal component coefficients representing said spectral data from each of said gamma ray detectors; and said sets of a plurality of principal component coefficients are applied to said filter to obtain said at least one value for said at least one earth formation property.

3. A method according to claim 2, wherein:

said step of compressing utilizing a principal components technique comprises, generating a calibration database by running said borehole tool or a borehole test tool which is at least substantially similar to said borehole tool in at least one hole in an earth or mock formation having said at least one property varying and known, said calibration database including data relating changes in said at least one property to changes in the number of gamma rays detected by said borehole tool, and conducting a principal components analysis on calibration database data and determining therefrom a plurality of principal components accounting for a substantial percentage of the variance of said calibration database data, wherein said principal component coefficients relate to said principal components.

4. A method according to claim 3, wherein:

said spatial deconvolution inversion matrix is generated from said calibration database.

5. A method according to claim 4, wherein:

said inverse filter is comprised of said spatial deconvolution inversion matrix and a noise matrix which models the statistical noise covariance of said borehole tool or said borehole test tool at a particular logging speed.

6. A method according to claim 1, wherein said second gamma ray detector is spaced from said nuclear source such that it has a negative response to increases in formation density, said method further comprising:

preprocessing said sets of data of said second gamma ray detector by taking the logarithm of the count rates in said plurality of energy channels prior to said compressing step, whereby said compressing step compresses preprocessed sets of spectral data of said second gamma ray detector.

7. A method according to claim 6, wherein:

said preprocessing step further comprises making gain and background corrections to said spectral data of said first and second gamma ray detectors, wherein said gain and background corrections are made to said spectral data of said second gamma ray detector prior to taking the logarithm of the count rate.

8. A method according to claim 5, wherein said second gamma ray detector is spaced from said nuclear source such that it has a negative response to increases in formation density, said method further comprising:

preprocessing said sets of data of said second gamma ray detector by taking the logarithm of the count rates in said energy windows prior to said compressing step, whereby said compressing steep compresses preprocessed sets of spectral data of said second gamma ray detector.

9. A method according to claim 8, wherein:

said preprocessing step further comprises making gain and background corrections to said spectral data of said first and second gamma ray detectors, wherein said gain and background corrections are made to said spectral data of said second gamma ray detector prior to taking the logarithm of the count rate.

10. A method according to claim 1, wherein:

said at least one property is at least one of formation density and formation $P_e$.

11. A method according to claim 9, wherein:

said at least one property is at least one of formation density and formation $P_e$.

12. A method according to claim 1, wherein:

said step of compressing comprises grouping a plurality of energy channels for each gamma ray detector into a plurality of energy windows.

13. A method according to claim 12, wherein:

said spatial deconvolution inversion matrix is generated from a calibration database generated by running said borehole tool or a borehole test tool which is at least substantially similar to said borehole tool in at least one hole in an earth or mock formation having said at least one property known and varying either in a single hole or over a plurality of holes, said calibration database including data relating changes in said at least one property to changes in the number of gamma rays detected by said borehole tool.

14. A method according to claim 13, wherein:

said inverse filter is comprised of said inversion matrix and a noise matrix which models the statistical noise covariance of said borehole tool or said borehole test tool at a particular logging speed.

15. A method according to claim 14, wherein said second gamma ray detector is spaced from said nuclear source such that it has a negative response to increases in formation density, said method further comprising:

processing said sets of data of said second gamma ray detector by taking the logarithm of the count rates in said plurality of energy channels after said compressing step.

16. A method according to claim 15, further comprising:

making gain and background corrections to said spectral data of said first and second gamma ray detectors, wherein said gain and background corrections are made to said spectral data of said second gamma ray detector prior to taking the logarithm of the count rate.

17. A method according to claim 16, wherein:

said at least one property is at least one of formation density and formation $P_e$.

* * * * *